(12) United States Patent
El Sherif et al.

(10) Patent No.: US 11,177,729 B2
(45) Date of Patent: Nov. 16, 2021

(54) ADAPTIVE AND EFFICIENT STANDBY POWER SUPPLY SCHEME FOR NEXT GENERATION LOW POWER AUTOMOTIVE SYSTEMS

(71) Applicant: NXP USA, Inc., Austin, TX (US)

(72) Inventors: Alaa Eldin Y El Sherif, Plano, TX (US); Keith Jackoski, Chandler, AZ (US); Neal G. Baltz, Phoenix, AZ (US); Ruchika Pandya, Tempe, AZ (US); Bo Wu, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 266 days.

(21) Appl. No.: 16/385,508

(22) Filed: Apr. 16, 2019

(65) Prior Publication Data

US 2020/0333873 A1    Oct. 22, 2020

(51) Int. Cl.
| | |
|---|---|
| *H02M 3/158* | (2006.01) |
| *H02M 1/00* | (2006.01) |
| *G06F 1/3293* | (2019.01) |
| *G06F 1/3296* | (2019.01) |
| *G05F 1/575* | (2006.01) |

(52) U.S. Cl.
CPC ........ *H02M 1/0032* (2021.05); *G06F 1/3293* (2013.01); *G06F 1/3296* (2013.01); *H02M 1/0045* (2021.05); *G05F 1/575* (2013.01)

(58) Field of Classification Search
CPC .............. H02M 3/158; H02M 3/1584; H02M 2001/0045; H02M 2001/0032; H02M 1/0045; H02M 1/0032; G06F 1/32; G06F 1/3203; G06F 1/3206; G06F 1/3212; G06F 1/3243
See application file for complete search history.

(56) References Cited

U.S. PATENT DOCUMENTS 5,353,215 A    10/1994 Dinwiddie et al.
7,207,054 B1    4/2007 Richards et al.
(Continued)

OTHER PUBLICATIONS

Hartshorne et al., "Adding an LDO for Increased Standby Mode Efficiency", Jun. 1, 2015, pp. 1-16, Texas Instruments Designs—TIDA-00393, retrieved from the internet at https://www.ti.com/lit/ug/tiduaa4/tiduaa4.pdf?ts=1596701257517&ref_url=https%253A%252Fwww.google.com%252F on Apr. 13, 2015.
Mazumdar et al., "A Digitally-Controlled Power-Aware Low-Dropout Regulator to Reduce Standby Current Drain in Ultra-Low-Power MCU", 16th International Symposium on Quality Electronic Design, Mar. 2, 2015, pp. 98-102, IEEE, Piscataway, NJ, USA.
(Continued)

*Primary Examiner* — Alex Torres-Rivera

(57) ABSTRACT

A method and system are provided for supplying power with an LDO linear voltage regulator (110) having an LDO power supply (114, 115) and a load switch (116) by connecting a power supply voltage (102, 104) to a main core (121) and a standby core (122) in a multi-core low power microcontroller (120) during an active mode so that the standby core receives a first supply voltage that tracks the power supply voltage during the active mode, and upon detecting a standby mode for the multi-core low power microcontroller, disconnecting the power supply voltage from the standby core and connecting a low dropout (LDO) linear power supply voltage to the standby core during the standby mode so that the standby core receives the LDO linear power supply voltage as a second supply voltage during the standby mode.

16 Claims, 5 Drawing Sheets

(56) References Cited

U.S. PATENT DOCUMENTS

| | | | |
|---|---|---|---|
| 7,880,456 B2* | 2/2011 | Falvey | H02M 3/158 |
| | | | 323/284 |
| 2005/0088856 A1* | 4/2005 | Yamamoto | H02M 3/1588 |
| | | | 363/19 |
| 2006/0158165 A1* | 7/2006 | Inn | H02M 3/1588 |
| | | | 323/280 |
| 2011/0113264 A1 | 5/2011 | Kim | |
| 2012/0223687 A1* | 9/2012 | Liu | H02M 3/1588 |
| | | | 323/271 |
| 2014/0223205 A1* | 8/2014 | Muthukaruppan | G06F 1/324 |
| | | | 713/320 |
| 2015/0054340 A1* | 2/2015 | Hayes | H02M 3/156 |
| | | | 307/31 |
| 2016/0109932 A1* | 4/2016 | Jeon | G11C 5/14 |
| | | | 713/323 |
| 2016/0179181 A1* | 6/2016 | Doyle | G05F 1/575 |
| | | | 713/323 |
| 2017/0308153 A1 | 10/2017 | Chou et al. | |
| 2019/0372450 A1* | 12/2019 | Cuenca | H02M 1/08 |
| 2019/0372460 A1* | 12/2019 | Cuenca | G05F 1/56 |

OTHER PUBLICATIONS

Texas Instruments, LM2936Q Ultra-Low Quiescent Current LDO Voltage Regulator, SNVS684C—Nov. 2010—revised Mar. 2013.

Rohm Semiconductor, Power Management IC Series for Automotive Body Control, High Voltage LDO Regulators, Technical Note, No. 11036EBT02, Mar. 2011—Rev B.

MPS, The Future of Analog IC Technology, MPQ2013-AEC1, 40V, 150mA, Low Quiescent Current Linear Regulator without EN Pin, MPQ2013A-AEC1 with EN Pin, MPQ2013 Rev. 1.2, May 24, 2016.

Texas Instruments, TPS7A16xx-Q1 60-V, 5-µA IQ, 100-mA, Low-Dropout Voltage Regulator With Enable and Power-Good, TPS7A1601-Q1, TPS7A1633-Q1, TPS7A1650-Q1, SBVS188D—Mar. 2012—Revised 2016.

Texas Instruments, TPS7A6xxx-Q1 300-mA, 40-V Low-Dropout Regulator With 25-µA Quiescent Current, TPS7A6033-Q1, TPS7A6050-Q1, TPS7A6133-Q1, TPS7A6150-Q1, SLVSA62H—Mar. 2010—Revised Mar. 2016.

* cited by examiner

250 ➘

↑ 251  ↑ 252  ↑ 253

260 ➘

↑ 261  ↑ 262  ↑ 263

ADAPTIVE AND EFFICIENT STANDBY POWER SUPPLY SCHEME FOR NEXT GENERATION LOW POWER AUTOMOTIVE SYSTEMS

BACKGROUND OF THE INVENTION

Field of the Invention

The present invention is directed in general to power supplies. In one aspect, the present invention relates to a power supply that is suitable for low power multi-core automotive systems.

Description of the Related Art

As automotive vehicles increasingly become "smarter" with deeper connections to the web, improved self-driving capabilities, connected car safety systems, and the like, the technology required to keep those vehicles connected to the digital world is becoming more important. However, the evolution of automotive connected-car technologies poses numerous design and operating challenges as the demand for more advanced embedded systems increasingly requires electronic component integration of higher performance automotive micro-controllers that are manufactured with advanced fabrication technologies, such as deep sub-micron CMOS process technologies. For example, automotive gateway embedded systems typically provide several essential performance capabilities, such as a standby or key-off mode for operating in a low power over extended periods of time while being able to detect changes in the surroundings, such as peripherals and car ignition signals. Additionally, such systems must be able to periodically wake and become active and fully powered before transitioning back to standby mode. The demand for frequent wake up has increased because of connected-car technology and remote access driver assistance features being added to vehicles.

To implement the operational requirements for providing a standby mode, existing automotive systems with slower and lower performance microcontrollers typically use a fixed power supply (e.g., a low-power linear regulator) to provide an active single power rail for maintaining a wake-up logic module embedded inside the microcontroller. However, higher performance microcontrollers built with advanced fabrication processes (e.g., deep submicron technologies) increasingly use multi-core architectures in which one CPU core supports the standby mode and at least another high-performance CPU core supports the active or wakeup mode. With such multi-core architectures on the next generation low-power microcontrollers, the standby low-power core supply voltage must be maintained at a tight tolerance (typically 20 mV-30 mV) with respect to the supply voltage of the high performance active-mode main core upon wake up in order to avoid any glitching during transition between standby and active modes (and vice versa) that would result in a microcontroller reset and a system failure. The requirement for keeping the active and standby supply voltages close together is exacerbated in multi-core architectures where individual active-mode cores can be set to different values from one part to another with power consumption optimization techniques, such as static voltage scaling or dynamic voltage scaling. Additionally, the growth of connected technologies in the 24V truck market segment and the introduction of 48V Mild Hybrid Vehicles continues to extend the battery maximum dc voltage to higher voltage levels (e.g., 70V), resulting in significant power dissipation requirements for conventional low dropout (LDO) linear regulators used to maintain the microcontroller power rail during standby mode. As seen from the foregoing, the existing solutions for supplying the low-power standby core with a fixed power supply are extremely difficult at a practical level by virtue of the difficulty of balancing the design and performance requirements in high performance multi-core microcontrollers built with advanced fabrication processes for keeping the standby core supply voltage close to the active core supply voltage upon wake up

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

An adaptive and efficient standby power supply architecture, method, system, and apparatus for a high performance multi-core microcontroller are provided for selectively generating an ultra-low quiescent current and supply low dropout voltage for a standby core during a standby mode and for tracking a main core supply voltage during an active mode while maintaining the standby core supply voltage within a specified tolerance of the main core supply voltage, thereby seamlessly transitioning between standby mode and active mode. In selected embodiments, a dual mode low dropout (LDO) linear voltage regulator circuit selectively provides an LDO output supply voltage to a standby core during standby mode under control of a digital control interface. In a standby mode, the digital control interface controls a parallel load switch to disconnect a high power supply from the standby core so that the LDO output supply voltage is connected as the supply voltage for the standby core. During an active or wakeup mode for the active core, the digital control interface controls the parallel load switch to source the standby core supply voltage from the main core supply voltage and to disable the LDO output to provide a track switching mode for the standby core. Before sending the microcontroller a confirmation of successful entry into standby mode, the digital control interface detects when the supply voltage at the active core is low enough, thereby ensuring that leakage in the active core is extremely low before confirming entry into standby mode. With the disclosed LDO linear voltage regulator circuit, system, and methodology, the digital control interface can be embodied with RTL control logic in a microcontroller integrated circuit to implement an efficient dual-mode power supply that is suitable for next generation deep-submicron multi-core automotive microcontrollers when operated in key-off (CAN Standby) mode and active mode with seamless transition.

Figure 1:
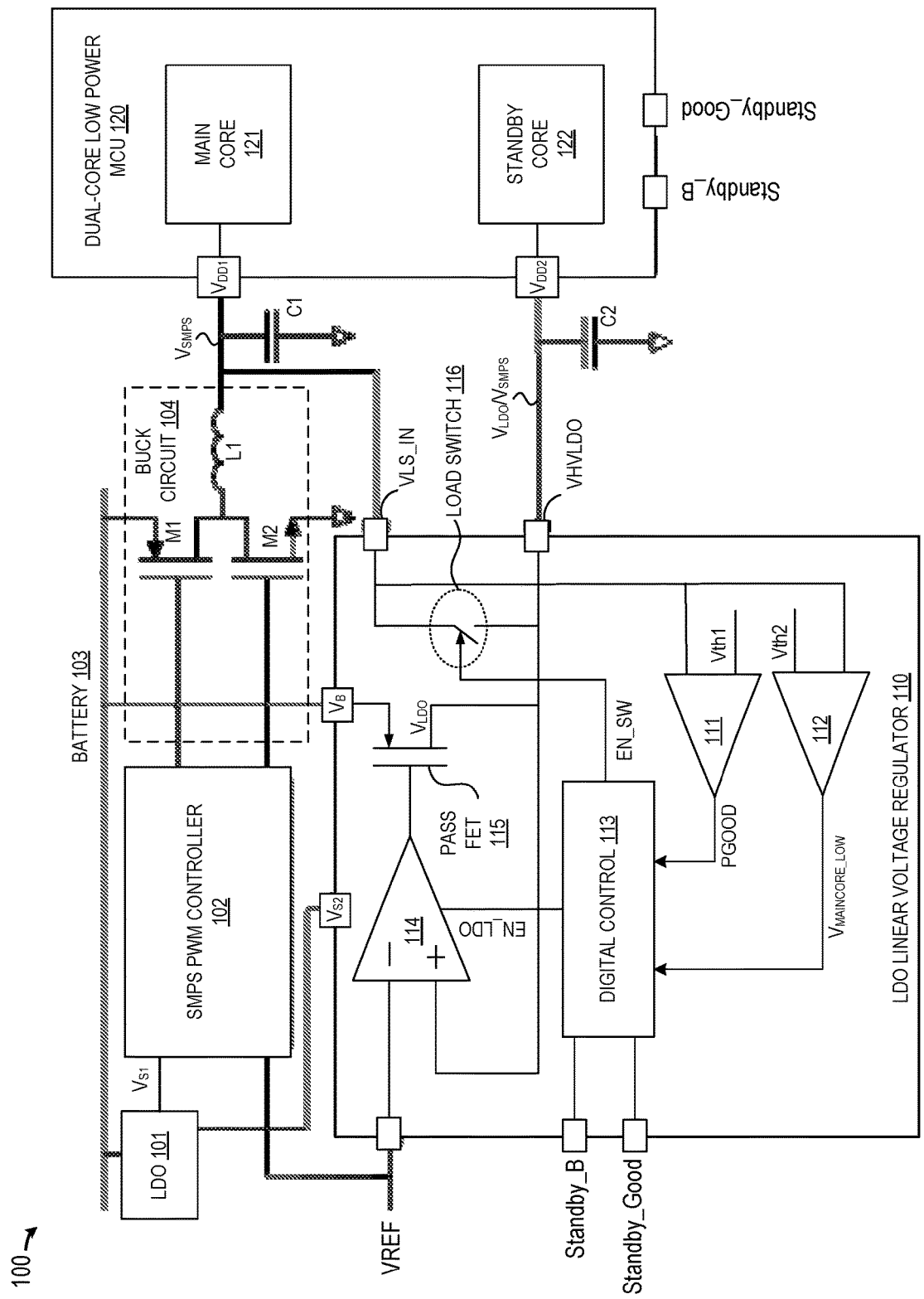
FIG. 1 is a simplified schematic circuit diagram illustrating an adaptive standby power supply for a low power dual-core microcontroller in accordance with selected embodiments of the disclosure.

To provide additional details for an improved understanding of selected embodiments of the present disclosure, reference is now made to FIG. 1 which is a simplified schematic circuit diagram illustrating an adaptive standby power supply 100 connected to a low power dual-core microcontroller 120. As depicted, the adaptive standby power supply 100 includes a first switched power supply 101-104 and a second LDO power supply 114-115 which are connected to provide, respectively, supply voltages $V_{SMPS}$, $V_{LDO}$ to the supply voltage input pins VDD1, VDD2 for the main core 121 and standby core 122 of the microcontroller 120 as described hereinbelow. To this end, the LDO linear voltage regulator 110 is provided with a load switch 116 to connect the supply voltage input pin VDD2 of the MCU 120 to receive the supply voltage $V_{SMPS}$ generated by the first switched power supply 101-104 during a tracking switch mode (e.g., during active mode), and to connect the supply voltage input pin VDD2 of the MCU 120 to receive the supply voltage $V_{LDO}$ generated by the second LDO power supply 110 during an LDO mode (e.g., during standby mode). Thus, the supply voltage $V_{LDO}$ is always connected to supply voltage input pin VDD2, but with the LDO pass FET 115 may be enabled or disabled, and with the switch 116 being disabled or enabled in a complementary fashion, the supply voltage provided to the supply voltage input pin VDD2 is switched from the supply voltage $V_{LDO}$ to track the switched mode power supply voltage ($V_{SMPS}$).

In operation, the first switched power supply 101-104 may be connected and configured to periodically wake up from a standby mode (e.g., in response to an activation control signal) and to generate a switched mode power supply voltage ($V_{SMPS}$) that is provided to the main core supply voltage input pin VDD1 during an active mode. While any suitable switched power supply arrangement may be used, selected embodiments of the first switched power supply include an LDO pre-regulator 101 and switched mode power supply (SMPS) pulse width modulator (PWM) controller 102 which are connected to the battery voltage source 103 to drive a DC/DC step down buck converter 104. The LDO pre-regulator 101 generates bias or supply voltages $V_{S1}$, $V_{S2}$, respectively, for the SMPS PWM controller 102 and the second LDO power supply 114-115. In this arrangement, the first switched power supply 101-104 generates the supply voltage $V_{SMPS}$ at the input capacitor C1 for connection to the supply voltage input pin VDD1 for main core 121. During active mode of operation when there is no voltage scaling, the first switched power supply 101-104 drives the main core supply voltage input pin VDD1 to a first voltage level (e.g., 0.8V), and during standby mode of operation, the first switched power supply 101-104 drives the main core supply voltage input pin VDD1 to a second voltage level (e.g., 0.0V). However, during active mode of operation when there is voltage scaling, the first switched power supply 101-104 drives the main core supply voltage input pin VDD1 to a first voltage level (e.g., 0.72-0.76V), and during standby mode of operation, the first switched power supply 101-104 drives the main core supply voltage input pin VDD1 driven to a second voltage level (e.g., 0.0V). Thus, the first switched power supply 101-104 drives the main core supply voltage input pin VDD1 to 0V during standby mode. During this mode, the digital control 113 then controls the LDO to be enabled using EN_LDO signal and disable the load switch 116 using EN_SW signal, thereby providing a supply voltage that can be used to drive the standby core 122 during standby mode as described hereinbelow.

In cases where the cores 121, 122 of a multi-core controller 120 have separate power supplies with tight core-to-core differential voltage tolerance requirements, the low-power standby core 122 cannot be supplied with a fixed power supply (e.g., a conventional battery-connected single-output low-power linear regulator). Instead, the LDO linear voltage regulator 110 is provided to connect the standby core supply voltage input pin VDD2 so that it tracks the main core supply voltage $V_{SMPS}$ at the input pin VDD1 during active modes, and to connect the standby core supply voltage input pin VDD2 to receive the LDO output supply voltage ($V_{LDO}$) during standby modes. To this end, the LDO linear voltage regulator 110 includes the second LDO power supply 114-115 which may be embodied with a linear amplifier 114 and pass FET 115 connected in a feedback configuration to generate the LDO output supply voltage ($V_{LDO}$). As depicted, an input reference voltage VREF is connected to an inverting input of the amplifier 114. In addition, the LDO output voltage ($V_{LDO}$) from the pass FET 115 is connected in feedback to a non-inverting input of the amplifier 114 to regulate the generated LDO output voltage when the amplifier 114 is enabled by the first enable control signal (EN_LDO). In addition, the LDO linear voltage regulator 110 may include a digital control 113 and parallel load switch 116 which are connected to selectively provide the standby core 122 with the LDO output supply voltage $V_{LDO}$ during standby mode, but to provide the standby core 122 with the main core supply voltage $V_{SMPS}$ during active mode.

To selectively provide the standby core 122 with supply voltages from first switched power supply 101-104 and the second LDO power supply 114-115 during active and standby modes, the digital control 113 generates an LDO enable signal (EN_LDO) during standby mode which activates the LDO amplifier 114 and pass FET 115 to generate the LDO output supply voltage $V_{LDO}$ at the input capacitor C2 for connection to the supply voltage input pin VDD2 for the standby core 122. In addition, the digital control 113 generates a switch enable signal (EN_SW) in standby mode to control the parallel load switch 116 to disconnect the standby core supply voltage input pin VDD2 from the main core supply voltage $V_{SMPS}$ generated at the main core supply voltage input pin VDD1 when transitioning from active/tracking mode to standby/LDO mode.

When transitioning from standby/LDO mode to active/tracking mode for the main core 121, the digital control 113 controls the parallel load switch 116 to connect the standby core supply voltage input pin VDD2 to the main core supply voltage $V_{SMPS}$ and to disable the LDO amplifier 114 from generating the LDO output supply voltage $V_{LDO}$, thereby enabling the standby core supply voltage to track the main core supply voltage $V_{SMPS}$ generated by the first switched power supply 101-104. In particular, the digital control 113 first enables the switch enable signal (EN_SW) upon detecting that the main core supply voltage $V_{SMPS}$ has reached a predetermined threshold voltage (e.g., PGOOD). In selected embodiments, the voltage monitor or comparator circuit 111 is connected to measure the main core supply voltage $V_{SMPS}$ at the supply voltage input pin VDD1 for the main core 121 and to generate a "PGOOD" signal input to the digital control 113 when the predetermined threshold voltage is reached. While any suitable voltage monitoring circuitry may be used, selected embodiments of the voltage monitor circuit 111 may include an analog-to-digital converter circuit and/or comparator circuit connected to detect if the analog voltage provided at the VLS_IN input node meets or exceeds a predetermined threshold voltage Vth. In response to the main core supply voltage $V_{SMPS}$ reaching the predetermined threshold voltage, the digital control 113 provides the enabled switch enable signal (EN_SW) to control the parallel load switch 116 to connect the standby core supply voltage input pin VDD2 to the main core supply voltage input pin VDD1. In addition, the digital control 113 disables the LDO enable signal (EN_LDO) during active mode to deactivate the LDO amplifier 114 and pass FET 115 from generating the LDO output supply voltage $V_{LDO}$. As a result, the standby core supply voltage input pin VDD2 is no longer driven by the LDO output supply voltage $V_{LDO}$, but is instead connected to track the main core supply voltage $V_{SMPS}$ during active mode.

When transitioning from active/tracking mode to the standby/LDO mode for the main core 121, the digital control 113 controls the parallel load switch 116 to disconnect the standby core supply voltage input pin VDD2 from the main core supply voltage $V_{SMPS}$ and to enable the LDO amplifier 114 to generate the LDO output supply voltage $V_{LDO}$, thereby enabling the standby core supply voltage to receive the LDO output supply voltage $V_{LDO}$ generated by the second LDO power supply 114-115. In particular, the digital control 113 first disables the switch enable signal (EN_SW) and enables the first enable control signal (EN_LDO) upon detecting that start of standby mode (e.g., STANDBY_B=0), thereby controlling the parallel load switch 116 to disconnect the standby core supply voltage input pin VDD2 from the main core supply voltage input pin VDD1 and also simultaneously activating the LDO amplifier 114 and pass FET 115 to generate the LDO output supply voltage $V_{LDO}$. In addition, the digital control 113 generates a signal or flag to send to the MCU 120 to indicate entry into standby mode. In selected embodiments, the digital control interface 113 detects when the supply voltage at the main core 121 is low enough before sending to the microcontroller 120 a confirmation of successful entry into standby mode, thereby ensuring that leakage in the main core 121 is extremely low before confirming entry into standby mode. To this end, the digital control 113 may include a second voltage monitor or comparator circuit 112 that is connected to measure the main core supply voltage $V_{SMPS}$ at the supply voltage input pin VDD1 for the main core 121 and to generate a "$V_{MAINCORE\_LOW}$" signal input to the digital control 113 when the main core supply voltage is low enough to be at or below a maximum threshold voltage. While any suitable voltage monitoring circuitry may be used, selected embodiments of the voltage monitor circuit 112 may include an analog-to-digital converter circuit and/or comparator circuit connected to detect if the analog voltage provided at the VLS_IN input node is at or below a predetermined threshold voltage Vth2. In response to the main core supply voltage $V_{SMPS}$ reaching the predetermined threshold voltage Vth2, the digital control 113 provides confirmation of successful entry into standby mode with the signal or flag, "$V_{MAINCORE\_LOW}$".

As seen from the foregoing, the LDO linear voltage regulator 110 is operative to provide a dual mode of operation with seamless transition between an LDO or standby mode (for supplying the LDO output supply voltage $V_{LDO}$ to the standby core 122) and tracking switch mode (for supplying the active supply voltage $V_{SMPS}$ to the standby core 122). In standby mode, the LDO amplifier 114 and pass FET 115 are controlled by the digital control 113 to provide an ultra-low quiescent current with limited and optimum power dissipation to generate the standby core supply voltage $V_{LDO}$ that is disconnected by the parallel load switch 116 from the main core supply voltage $V_{SMPS}$. However, in the tracking switch mode that services the active mode, the digital control 113 controls the parallel load switch 116 to connect the standby core supply voltage input pin VDD2 to the main core supply voltage $V_{SMPS}$ so as to maintain the standby core supply voltage within a tight tolerance of the main core supply voltage $V_{SMPS}$ as required by the deep-submicron dual-core low-power MCUs. Using the parallel load switch 116 to connect the standby core supply voltage input pin VDD2 to the main core supply voltage input pin VDD1 during wake up, the standby low-power core 122 is powered at a voltage within a small difference, typically 20 to 30 mV, with respect to the supply voltage of the higher performance active-mode core 121, thereby providing seamless transitions between standby and active modes (and vice versa) to avoid any glitching that may result in microcontroller reset and system failure. Additionally, the deactivation of the LDO amplifier 114 and pass FET 115 during active mode reduces power dissipation, a significant power saving benefit with automotive vehicles which use high voltage batteries, such as the 24V truck vehicles, 48V mild hybrid vehicles, and even larger batteries.

Figure 2A:
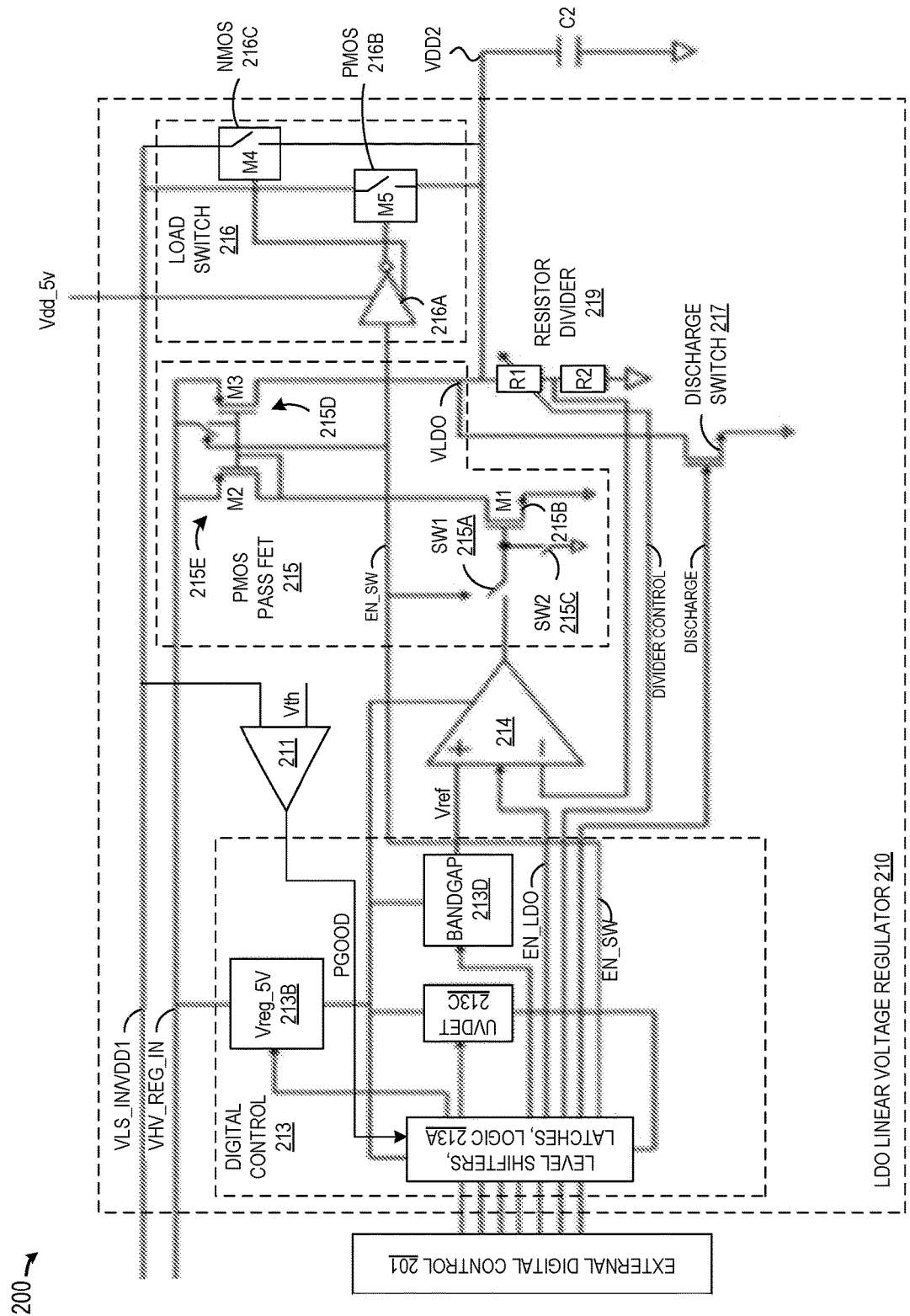
FIG. 2A is a simplified schematic circuit diagram illustrating a dual mode low dropout (LDO) linear voltage regulator circuit which selectively provides an LDO output supply voltage to a standby core supply voltage node during standby mode, and which disables the LDO output supply voltage and connects the standby core supply voltage node to the main core supply voltage during active mode to provide a track switching mode in accordance with selected embodiments of the disclosure.

To provide additional details for an improved understanding of selected embodiments of the present disclosure, reference is now made to FIG. 2A which is a simplified schematic circuit diagram 200 illustrating a dual mode low dropout (LDO) linear voltage regulator circuit 210 that can be powered in two modes from a high voltage automotive battery (e.g., VHV_REG_IN=60V), thereby providing an output voltage VDD2 with good accuracy. In a first operational or standby mode, the LDO linear voltage regulator 210 enables the LDO power supply 214, 215 to generate an output voltage VLDO that is provided to the standby core supply voltage node VDD2 which is disconnected from the main core supply voltage node VLS_IN/VDD1 by the load switch 216. In a second operational or wakeup mode, the LDO linear voltage regulator 210 disables the LDO power supply 214, 215 from generating the output voltage VLDO, and the standby core supply voltage node VDD2 is connected to the main core supply voltage node VLS_IN/VDD1 by the load switch 216 to provide a track switching mode. As depicted, the LDO linear voltage regulator circuit 210 is connected to receive inputs from external digital control logic 201, along with power supply inputs from the battery VHV_REG_IN, the main core supply voltage node VLS_IN/VDD1, and a lower voltage supply Vdd_5V. In addition, the LDO linear voltage regulator circuit 210 includes a comparator 211, digital control circuit/module 213, an error amplifier 214, PMOS pass FET switch 215D, a discharge switch 217 for discharging the output voltage VLDO in response to a discharge signal, a load switch 216, and a resistor divider circuit 219 for selectively generating supply voltages for standby core supply voltage node VDD2 in response to the switch enable signal (EN_SW).

In the LDO linear voltage regulator 210, the error amplifier 214, PMOS pass FET switch and buffer circuit 215, and load switch 216 are connected with any suitable configuration such that the switch/buffer circuit 215 can be turned OFF and the load switch can be 216 turned ON so that the standby core supply voltage node VDD2 tracks the main core supply voltage node VLS_IN/VDD1 during standby mode. For example, the error amplifier 214 and PMOS pass FET switch and buffer circuit 215 may be connected with a resistor divider circuit 219 in a feedback arrangement to generate the LDO output supply voltage VLDO across capacitor C2 at the standby core supply voltage node VDD2. As described more fully below, the LDO linear voltage regulator 210 is operative to generate the LDO output supply voltage VLDO in response to the switch enable signal (EN_SW) which connects the PMOS pass FET 215D between the error amplifier 214 via a buffer consisting of 215B and 215E and resistor divider circuit 219, and which disables or opens the load switch 216. In particular, the error amplifier 214 is connected to the input gate of the pass-transistor 215. The source connection of the pass-transistor 215D is connected to a battery voltage supply (VHV_REG_IN) and the drain of the pass-transistor 215D provides the LDO output supply voltage VLDO. The capacitor C2, which may be either an internal capacitor or external to the regulator circuit, is connected to the LDO output supply voltage VLDO. The resistance divider network 219 is also connected to the LDO output supply voltage VLDO and in parallel with the capacitor C2. A node between the resistors R1 and R2 of the resistor divider network 219 is connected to an inverting input terminal of the error amplifier 214 and provides a scaled-down version of the output voltage VLDO to the error amplifier 214. The error amplifier 214 also receives a reference voltage signal Vref. The error amplifier 214 compares the reference voltage signal Vref and the scaled down version of the output voltage signal VLDO to generate an error amplified signal, which is provided to the buffer circuit 215. The error amplified signal is used to maintain the output of the LDO linear voltage regulator 210 at a predetermined voltage when activated.

While the pass-transistor 215D may be functionally embodied as a PMOS pass FET, it will be appreciated that additional buffer and switching circuitry may be included with the pass-transistor 215D. For example, M1 (215B) NMOS and M2 (215E) PMOS form a buffer to isolate the error amplifier 214 and PMOS pass FET 215D. This helps in providing better stability as well as high voltage protection from the battery voltage applied at VHV_REG_IN. Additionally, switches, 215A, 215B and 215C help is closing the path during the standby mode operation connecting the error amplifier 214 output to the gate of NMOS 215B. As depicted, the NMOS 215B has an input gate connected to the output of the error amplifier 214 over a first control switch SW1 215A that is controlled by the switch enable signal (EN_SW). In addition, the NMOS 215B has its gate connected to the ground over a second control switch SW2 215C that is controlled by the inverted switch enable signal (EN_SW_B). The drain of the NMOS 215B is connected to a ratioed PMOS current mirror circuit 215D across the resistor divider circuit 219 to generate the output voltage signal VLDO in response to the switch enable signal (EN_SW).

As indicated above, the error amplifier 214 is connected with the PMOS pass FET 215D and resistor divider circuit 219 in a feedback configuration to provide a good output voltage VLDO at the standby core supply voltage node VDD2 while consuming ultra-low quiescent current in a first standby mode of operation for the LDO linear voltage regulator 210. However, the LDO linear voltage regulator 210 can be configured in a second tracking mode of operation where the LDO linear voltage regulator 210 is disabled from generating the output voltage VLDO, and the standby core supply voltage node VDD2 is connected to the main core supply voltage node VLS_IN/VDD1 by the load switch 216 under control of the switch enable signal (EN_SW).

As disclosed herein, the load switch 216 may be functionally embodied as a single FET switch, but it will be appreciated that additional switching circuitry may be included in the load switch 216. For example, the load switch 216 may be embodied as a parallel load switch which is connected to a lower voltage supply up to 5.5V for supplying a control circuit 216A. A parallel PMOS and NMOS switch may be incorporated to allow wide input range for tracking capability from the main core supply to the standby core supply. For example, PMOS 216B is used for high voltages (e.g., 3.3V) and NMOS 216C is used for low voltages (e.g., 0.8V). However, it will be appreciated that either or both of the parallel PMOS and NMOS switches 216B, 216C may be used, depending upon the requirements of the application. Circuit 216A generates complementary output signals to drive a PMOS transistor 216B and NMOS transistor 216C which are connected in parallel with proper isolation (e.g., as back-to-back switches for providing reverse current protection) to connect the standby core supply voltage node VDD2 to the main core supply voltage node VLS_IN/VDD1. In operation, the load switch 216 is controlled by the switch enable signal (EN_SW) which is supplied to the control circuit 216A to activate the switch 216 during normal operation (active mode) to deliver much higher power to the output pin VDD2, while the low power high voltage LDO is disabled (e.g., by opening the switch 216A).

Figure 2B:
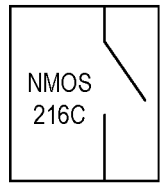
FIG. 2B is a simplified schematic circuit depiction of selected PMOS and NMOS switch embodiments which may be used to implement a load switch in accordance with selected embodiments of the disclosure.
Figure 2B:
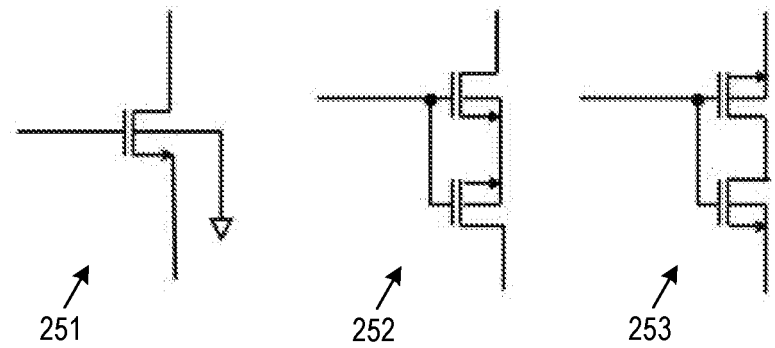
Figure 2B:
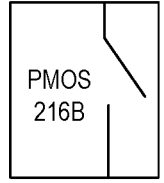
Figure 2B:
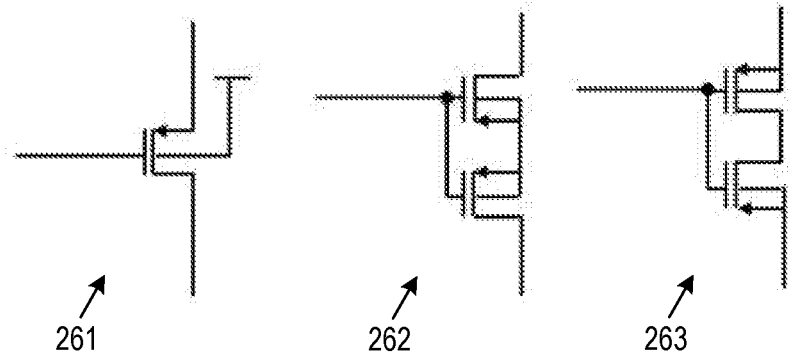

To provide additional details for an improved understanding of selected embodiments of the present disclosure, reference is now made to FIG. 2B which is a simplified schematic circuit depiction of selected PMOS and NMOS switch embodiments 250, 260 which may be used to implement the NMOS switch 216C and PMOS switch 216B which are connected in parallel in the load switch 216 shown in FIG. 2A. If the common mode voltage is very low, an NMOS switch will be needed, and if the common mode voltage is very high, a PMOS switch will be needed. In order to cover a wide input common mode range on the input both NMOS and PMOS switches 216C, 216B will be needed. As will be appreciated, the NMOS and PMOS switches 216C, 216B can be implemented with different switch configurations. For example, the NMOS switch 216C can be implemented by any of the NMOS switch configurations 251, 252 or 253 or any other such equivalent way in order to ensure there is no reverse current. In addition, the PMOS switch 216B can be implemented by any of the PMOS switch configurations 261, 262 or 263 or any other such equivalent way in order to ensure there is no reverse current. Of course, different combinations can be used by selecting one of the NMOS switches 251, 252 or 253 and one of the PMOS switches 261, 262, or 263 to implement load switch 216. The use of any of the combination of these switches 251-253, 261-263 to implement the load switch 216 guarantees a bi-directional switch with proper isolation.

To control the operation mode of the LDO linear voltage regulator 210 to limit the power dissipation and offer input supply tracking characteristics, a digital control interface 213 is used to instruct the configuration of the circuit 210. In a first configuration, the LDO linear voltage regulator 210 generates an ultra-low quiescent current that is limited (e.g., to 10 mA) but sufficient to support the low power standby mode of operation. In a second configuration, the LDO linear voltage regulator 210, the load switch 216 is activated during normal operation to deliver much higher power to the output pin VDD2 while the low power high voltage LDO is disabled. In selected embodiments, the digital control interface 213 may be programmed through an I2C/SPI interface or OTP bits provided by the external digital control modules 201, so that the LDO linear voltage regulator 210 is operating in either a standby mode (LDO mode) or active mode (tracking mode). While any suitable digital control logic and/or circuitry may be used, selected embodiments of the digital control interface 213 may include a block of level shifters, latches, and logic 213A which process signal information received from the external digital control logic 201. In addition, the digital control interface 213 may include an embedded under-voltage detector 213C and a low power bandgap 213D as an internal voltage reference, where both are powered by an internal 5V pre-regulator 213B. As disclosed herein, the block of level shifters, latches, and logic 213A are structured and configured to control the embedded under-voltage detector 213C and low power bandgap 213D. In addition, the logic circuitry 213A are embodied to generate the switch enable signal (EN_SW) and LDO enable signal (EN_LDO) in response to detecting that the main core supply voltage VDD1 has reached a predetermined threshold voltage Vth.

While the threshold voltage evaluation function may be implemented with any suitable detection circuit, the LDO linear voltage regulator 210 may include a comparator 211 which provides a voltage monitoring function for comparing the main core supply voltage node VLS_IN/VDD1 against a predetermined threshold voltage Vth. In selected embodiments, the comparator 211 may be embodied with an analog-to-digital converter circuit for generating a digital voltage value, memory storage or register for storing the predetermined threshold voltage Vth value, and comparator for comparing the digital voltage value to the predetermined threshold voltage Vth value. Alternatively, the comparator 211 may be embodied as an analog comparison circuit for comparing the analog voltage provided at the VLS_IN input node to a predetermined threshold voltage Vth value.

Figure 3:
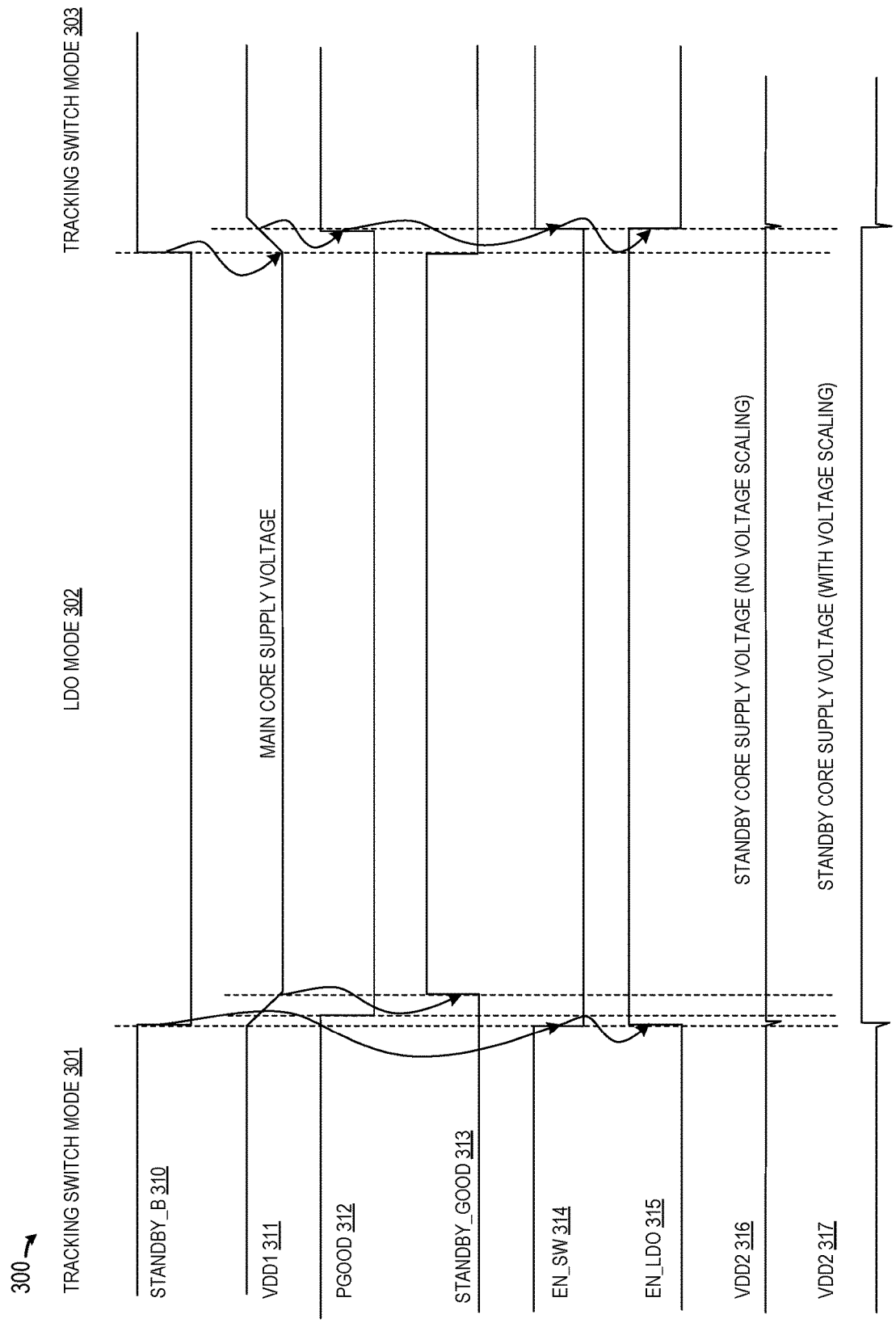
FIG. 3 illustrates mode transition timing diagram waveforms of the dual mode LDO linear voltage regulator circuit depicted in FIG. 2A.

To provide additional details for an improved understanding of selected embodiments of the present disclosure, reference is now made to FIG. 3 which illustrates mode transition timing diagram waveforms 300 of the dual mode LDO linear voltage regulator circuit which transitions from a track switching mode 301 to an LDO mode 302 and back to a track switching mode 303. Generally speaking, the track switching modes 301, 303 are defined by a "standby" signal having a first value (e.g., STANDBY_B=1 or STANDBY=0) which corresponds to an "active state" when the standby core supply voltage(s) track the switched mode power supply voltage $V_{SMPS}$, while the LDO mode(s) 302 are defined by the "standby" signal having a second value (e.g., STANDBY_B=0 or STANDBY=1) when the standby core supply voltage(s) are connected to a low power high voltage power supply voltage $V_{LDO}$.

In selected embodiments, the initial state upon powerup is the "active mode" wherein the main and standby cores are both powered by the same switched mode power supply voltage source, such that the standby core tracks the supply voltage $V_{SMPS}$ generated by a first power supply. In the active mode when the STANDBY_B signal waveform 310 is set, the main core supply voltage VDD1 311 s driven to a first output voltage level (e.g., 0.8V) which is reflected in "PGOOD" signal waveform 312 which indicates that the main core supply voltage exceeds a minimum threshold voltage. By the same token, the "STANDBY_GOOD" signal waveform 313 has a first or lower value to indicate that the main core supply voltage is above a maximum threshold voltage, and therefore not in a low leakage current state that is ready for transition to standby mode. During the active mode when the standby core supply voltage is connected to track the switched mode power supply voltage $V_{SMPS}$, the EN_SW control signal 314 is set to turn ON the load switch which connects the standby core to the switched mode power supply voltage $V_{SMPS}$. At the same time, the EN_LDO control signal 315 is reset to disable the LDO power supply. As a result, the standby core power supply voltage has a first voltage value, as seen with the VDD2 waveforms 316, 317.

Upon transitioning from the "active mode" to the "standby mode" wherein the standby core is powered by a separate LDO power supply voltage source, the STANDBY_B signal waveform 310 is reset, at which time the main core supply voltage VDD1 311 is driven to a second output voltage level (e.g., 0.0V) which causes the "PGOOD" signal waveform 312 to reset when the main core supply voltage 311 no longer exceeds the minimum threshold voltage. And once the main core supply voltage 311 is below the maximum threshold voltage, the "STANDBY_GOOD" signal waveform 313 transitions to a second or upper value to indicate that the main core supply voltage is below the maximum threshold voltage, and therefore in a low leakage current state for the standby mode. In response to switching from the active mode to the standby mode (e.g., when the STANDBY_B signal waveform 310 transitions from "high" to "low"), the EN_SW control signal 314 is reset to turn OFF the load switch, thereby disconnecting the standby core from the switched mode power supply voltage $V_{SMPS}$. At the same time, the EN_LDO control signal 315 is set to enable the LDO power supply. As a result, the standby core power supply voltage has a second voltage value that is driven by the LDO power supply. In embodiments where there is no scaling, the second voltage value of the standby core power supply voltage VDD2 is substantially the same as when in the active/tracking mode, as seen with the VDD2 waveform 316. However, in embodiments where there is scaling, the second voltage value of the standby core power supply voltage VDD2 is adjusted up (or down) based on the scaling, as seen with the VDD2 waveform 317.

Upon transitioning from back to the "tracking/active mode" from the "LDO/standby mode," the standby core is disconnected from the LDO power supply voltage source and reconnected to track the supply voltage $V_{SMPS}$. This mode switch occurs when the STANDBY_B signal waveform 310 is set, at which time the main core supply voltage VDD1 311 is driven back to the output voltage level (e.g., 0.8V) which causes the "PGOOD" signal waveform 312 to reset when the main core supply voltage 311 exceeds the minimum threshold voltage. And once the main core supply voltage 311 is above the maximum threshold voltage, the "STANDBY_GOOD" signal waveform 313 transitions to the first or lower value to indicate that the main core supply voltage is above the maximum threshold voltage. In response to switching from the LDO/standby mode to the tracking/active mode (e.g., when the STANDBY_B signal waveform 310 transitions from "low" to "high"), the EN_SW control signal 314 is set to turn the load switch ON, thereby connecting the standby core to the switched mode power supply voltage $V_{SMPS}$. At the same time, the EN_LDO control signal 315 is reset to disable the LDO power supply. As a result, the standby core power supply voltage returns to the first voltage value that is driven by the supply voltage $V_{SMPS}$.

Figure 4:
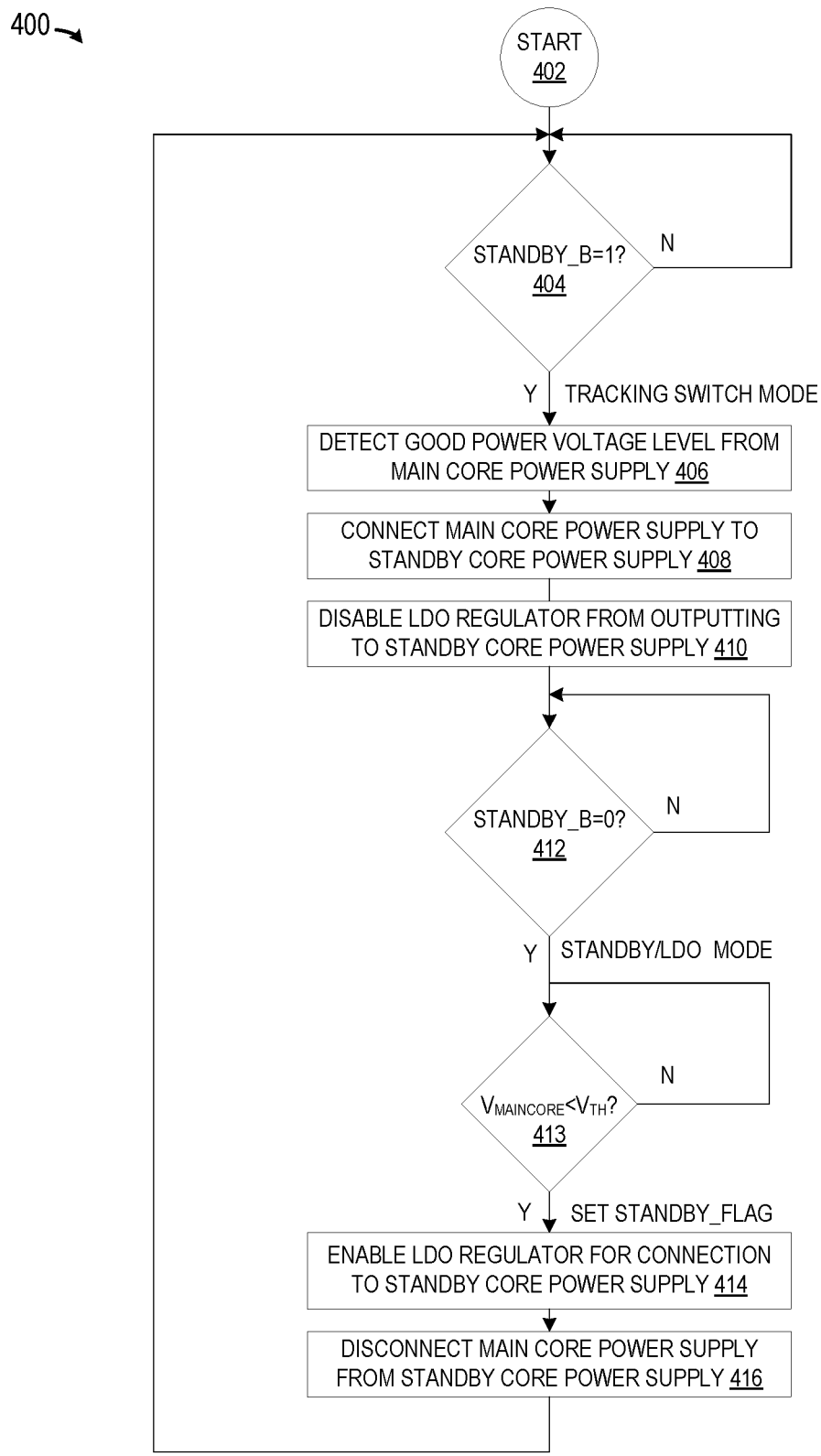
FIG. 4 illustrates a simplified flow chart showing the control logic for operating an adaptive standby power supply for a low power dual-core microcontroller in accordance with selected embodiments of the present disclosure.

To provide additional details for an improved understanding of selected embodiments of the present disclosure, reference is now made to FIG. 4 which illustrates a simplified flow chart 400 showing the control logic for operating an adaptive standby power supply for a low power dual-core microcontroller in accordance with selected embodiments of the present disclosure. In an example embodiment, the processing shown in FIG. 4 may be performed by a microcontroller or other processor-based functionality, such as a power management unit that is programmed with RTL code that is connected to detect the operating state of a switched power mode supply voltage against upper and lower voltage thresholds in order to selectively activate and connect a high voltage low power low drop-out (LDO) linear regulator to a standby core.

At step 402, the control logic and/or hardware at the power management unit are configured to start the process, such as when the system boots up or initially starts operating. At step 404, the control logic and/or hardware at the power management unit are configured to start system monitoring to detect if the SMPS is in a wakeup or active mode. While any suitable detection approach may be used, in selected embodiments, a wakeup or active mode may be detected with reference to a wakeup signal provided by the low-power MCU (e.g., STANDBY_B=1). If not (negative outcome to detection step 404), the system continues to wait until a wakeup/active mode is detected. However, when a wakeup signal is detected (affirmative outcome to detection step 404), then the system enters into a tracking switch mode.

At step 406, the control logic and/or hardware at the power management unit are configured to evaluate the main core power supply output voltage against a specified minimum voltage threshold to detect if a good power voltage level is provided. As will be appreciated, dedicated voltage monitoring circuitry and/or software may be used to implement a comparator function for measuring the main core power supply output voltage against a minimum voltage threshold (e.g., Vth1) to generate a good power voltage level signal (e.g., PGOOD) when the minimum voltage threshold is reached or exceeded.

At step 408, the main core power supply output voltage is connected to the standby core power supply. While any suitable connection mechanism may be used, in selected embodiments of the present disclosure, the connection may be made with a parallel load switch that is controlled by a switch enable signal that is digitally generated in response to the good power voltage level signal.

When connecting the main core power supply output voltage to the standby core power supply, the high voltage low power low LDO linear regulator is disabled or otherwise disconnected from the standby core power supply at step 410. As a result, the standby core is powered by the main core power supply output voltage. While any suitable mechanism may be used to disable the LDO regulator, in selected embodiments of the present disclosure, the LDO regulator may be disabled by disabling a linear amplifier and/or pass FET with an enable signal that is digitally generated in response to the good power voltage level signal.

At step 412, the control logic and/or hardware at the power management unit are configured to start system monitoring to detect if the SMPS is in a standby mode. While any suitable detection approach may be used, in selected embodiments, a standby mode may be detected with reference to a standby signal provided by the low-power MCU (e.g., STANDBY_B=0). If not (negative outcome to detection step 412), the system continues to wait until a standby mode is detected. However, when a standby signal is detected (affirmative outcome to detection step 412), then the system enters into a standby or LDO mode.

At step 413, the control logic and/or hardware at the power management unit are configured to evaluate the main core power supply output voltage against a specified maximum voltage threshold to detect if the main core power supply output voltage is below the maximum voltage threshold. As will be appreciated, dedicated voltage monitoring circuitry and/or software may be used to implement a comparator function for measuring the main core power supply output voltage against the maximum voltage threshold (e.g., Vth2) to generate a low voltage level signal (e.g., STANDBY_GOOD).

At step 414, the high voltage low power low LDO linear regulator is enabled for connection to the standby core power supply. As a result, the standby core is powered by the LDO linear regulator. While any suitable mechanism may be used to enable the LDO regulator, in selected embodiments of the present disclosure, the LDO regulator may be enabled by enabling a linear amplifier and/or pass FET with an enable signal that is digitally generated in response to the low voltage level signal.

When enabling the LDO linear regulator, the main core power supply output voltage is disconnected from the standby core power supply at step 416. While any suitable disconnection mechanism may be used, in selected embodiments of the present disclosure, the disconnection may be implemented with a parallel load switch that is controlled by a switch enable signal that is digitally generated in response to the low voltage level signal. Subsequently, the system reverts back to step 404 to detect when SMPS returns to the wakeup or active mode, and the steps 404-416 are repeated.

As disclosed herein, the power supply controller method, system, and apparatus for a low power multi-core integrated circuit microcontroller may be implemented with a first voltage supply for a high performance active-mode main core and a second LDO voltage supply for a standby core which are selectively connected to a standby core by a parallel load switch that is digital controlled by control logic and/or computer program product. Although embodiments are described in the context of monitoring the first voltage supply from a buck converter SMPS circuit with digital control logic, the proposed power supply control steps and/or functionality may be applied to monitor any suitable voltage supply for a high performance active-mode main core and to selectively generate the second LDO voltage supply for the standby core during a standby mode by tracking the first voltage supply during an active mode to maintain the standby core supply voltage within a specified tolerance of the main core supply voltage, thereby seamlessly transitioning between standby mode and active mode.

Some of the above embodiments, as applicable, may be implemented using a variety of different data processing systems. For example, although FIGS. 1 and 2 and the discussion thereof describe an exemplary adaptive standby power supply architecture, this architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architecture depicted herein is merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

By now it should be appreciated that there is provided herein a power supply system, apparatus, and methodology for connecting dual power supplies to a high performance main core and a standby core in a multi-core low power microcontroller. The dual power supplies may include a first power supply (for generating a high power supply voltage with a switch mode power supply comprising a pulse width modulator (PWM) controller and a buck converter) and a second ultra-low quiescent current low dropout (LDO) voltage regulator for generating an LDO linear power supply voltage. In the disclosed methodology, a high power supply voltage is connected to a high performance main core and a standby core in a multi-core low power microcontroller during an active mode for the multi-core low power microcontroller so that the standby core receives a first supply voltage that tracks the high power supply voltage during the active mode. In selected embodiments, the high power supply voltage is connected to the standby core during active mode by closing a parallel load switch formed on an integrated circuit LDO linear voltage regulator with a switch enable signal. During the active mode, an integrated circuit LDO linear voltage regulator may be disabled with a disable signal. Before connecting the high power supply voltage to the standby core, the high power supply voltage may be measured to detect if it meets or exceeds a minimum voltage threshold. Upon subsequently detecting a standby mode for the multi-core low power microcontroller, the high power supply voltage is disconnected from the standby core and a low dropout (LDO) linear power supply voltage is connected to the standby core during the standby mode for the multi-core low power microcontroller so that the standby core receives the LDO linear power supply voltage as a second supply voltage during the standby mode. In selected embodiments, the low dropout (LDO) linear power supply voltage is connected to the standby core by enabling an integrated circuit LDO linear voltage regulator with an enable signal during the standby mode. Upon detecting an active mode for the multi-core low power microcontroller that occurs after the standby mode, the high power supply voltage may be reconnected to the high performance main core and standby core while disabling the LDO linear power supply voltage so that the standby core receives the first supply voltage that tracks the high power supply voltage during the active mode. In selected embodiments, the high power supply voltage is (re)connected by providing a switch enable signal to a parallel load switch comprising an input inverter buffer control circuit connected to gate terminals of an NMOS switch and PMOS switch connected in parallel between the high power supply voltage and the LDO linear power supply voltage.

In another form, there is provided a method, processing system, and circuit for providing adaptive standby power to a multi-core microcontroller which includes a first power supply and a low dropout (LDO) linear power supply regulator. The disclosed first power supply generates a first high power supply voltage that is connected to a first core in the multi-core microcontroller. In selected embodiments, the first power supply is embodied with a switched mode power supply having a pulse width modulator (PWM) controller and a buck converter. The disclosed LDO linear power supply regulator includes an LDO linear power supply for generating an LDO power supply voltage in response to a first enable signal, where the LDO power supply voltage is connected as a supply voltage to a standby core in the multi-core microcontroller. In selected embodiments, the LDO linear power supply is embodied as an ultra-low quiescent current LDO voltage power supply which includes an error amplifier that drives an internal PMOS pass FET. The disclosed LDO linear power supply regulator also includes a load switch connecting the first high power supply voltage as the supply voltage to the standby core in response to a second enable signal. In selected embodiments, the load switch is embodied with an NMOS switch and PMOS switch that are connected in parallel between the first high power supply voltage and the LDO power supply voltage and that are controlled by the second enable signal. In addition, the disclosed LDO linear power supply regulator includes a digital control interface which generates the first and second enable signals so that, during an active mode, the first enable signal disables the LDO linear power supply regulator and the second enable signal closes the load switch to connect the first high power supply voltage as the supply voltage to the standby core, and so that, during a standby mode, the first enable signal enables the LDO linear power supply regulator and the second enable signal opens the load switch to disconnect the first high power supply voltage from the supply voltage to the standby core. In selected embodiments, the LDO linear power supply, load switch, and digital control interface are formed in a single integrated circuit LDO linear power supply regulator. In selected embodiments, the LDO linear power supply regulator may also include a first voltage monitor circuit that is connected to detect that the first high power supply voltage meets or exceeds a minimum voltage threshold before notifying the digital control interface that the second enable signal can be generated to the load switch for connecting the first high power supply voltage as the supply voltage to the standby core. In other embodiments, the LDO linear power supply regulator may include a second voltage monitor circuit that is connected to detect that the first high power supply voltage is at or below a maximum voltage threshold before notifying the digital control interface that the first enable signal can be generated to enable the LDO linear power supply.

In yet another form, there is provided a power supply circuit or apparatus for a multi-core microcontroller. The disclosed power supply circuit includes a switched mode power supply having a switching regulator configured to convert an input voltage of the power supply circuit to a high power supply voltage which is connected to a first core in the multi-core microcontroller. The disclosed power supply circuit also includes a low dropout (LDO) linear voltage regulator which is connected between the switched mode power supply and a standby core in the multi-core microcontroller. In the LDO linear voltage regulator, an error amplifier and internal pass FET are configured and connected to convert the input voltage of the power supply circuit to a standby low-power core supply voltage for the standby core when the power supply circuit is in a standby operational mode, and to be disabled when the power supply circuit is in an active operational mode. In addition, the LDO linear voltage regulator includes an internal load switch which connects the high power supply voltage to a standby supply voltage node of the standby core during active operational mode and which disconnects the high power supply voltage from the standby supply voltage node of the standby core during standby operational mode so that standby low-power core supply voltage is maintained within approximately 20 mV-30 mV with respect to the high power supply voltage upon transitioning from the standby operational mode to the active operational mode. In selected embodiments of the internal load switch, an NMOS switch and PMOS switch are connected in parallel between the high power supply voltage and the standby supply voltage node of the standby core and controlled by the second enable signal. In selected embodiments, the LDO linear voltage regulator also includes a digital control which generates first and second enable signals so that, during active operational mode, the first enable signal disables the LDO linear voltage regulator and the second enable signal closes the internal load switch to connect the high power supply voltage as the supply voltage to the standby core, and so that, during a standby mode, the first enable signal enables the LDO linear voltage regulator and the second enable signal opens the internal load switch to disconnect the high power supply voltage from the standby core. In selected embodiments, the LDO linear voltage regulator is a single integrated circuit LDO linear power supply regulator.

Various illustrative embodiments of the present invention have been described in detail with reference to the accompanying figures to illustrate exemplary representations in terms of an adaptive standby power supply and associated method of operation, but the present disclosure is not necessarily limited to the example embodiments which illustrate inventive aspects of the present invention that are applicable to a wide variety of power controllers. Thus, while various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Although the described exemplary embodiments disclosed herein are directed to an exemplary multi-channel direct memory access hardware engine, the present invention is not necessarily limited to the example embodiments illustrate herein, and various embodiments of the circuitry and methods disclosed herein may be implemented with other devices and software components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for supplying power, comprising:
   connecting a power supply voltage to a main core and a standby core in a multi-core low power microcontroller during an active mode for the multi-core low power microcontroller so that the standby core receives a first supply voltage that tracks the power supply voltage during the active mode; and
   upon detecting a standby mode for the multi-core low power microcontroller, disconnecting the power supply voltage from the standby core and connecting a low dropout (LDO) linear power supply voltage to the standby core during the standby mode for the multi-core low power microcontroller so that the standby core receives the LDO linear power supply voltage as a second supply voltage during the standby mode, where connecting the power supply voltage comprises providing a switch enable signal to a parallel load switch comprising an input inverter buffer control circuit connected to gate terminals of an NMOS switch and PMOS switch connected in parallel between the power supply voltage and the LDO linear power supply voltage.

2. The method of claim 1, further comprising generating the power supply voltage with a switch mode power supply comprising a pulse width modulator (PWM) controller and a buck converter.

3. The method of claim 1, further comprising generating the low dropout (LDO) linear power supply voltage with an ultra-low quiescent current LDO voltage regulator.

4. The method of claim 1, where connecting the power supply voltage comprises closing a parallel load switch formed on an integrated circuit LDO linear voltage regulator with a switch enable signal to connect the power supply voltage to the standby core.

5. The method of claim 1, where connecting the low dropout (LDO) linear power supply voltage to the standby core comprises enabling an integrated circuit LDO linear voltage regulator with an enable signal during the standby mode.

6. The method of claim 1, further comprising disabling an integrated circuit LDO linear voltage regulator with a disable signal during the active mode.

7. The method of claim 1, further comprising detecting that the power supply voltage meets or exceeds a minimum voltage threshold before connecting the power supply voltage to the standby core.

8. The method of claim 1, further comprising:
  upon detecting an active mode for the multi-core low power microcontroller, reconnecting the power supply voltage to the main core and standby core while disabling the LDO linear power supply voltage so that the standby core receives the first supply voltage that tracks the power supply voltage during the active mode.

9. A multi-core microcontroller processing system, comprising:
  a first power supply for generating a first power supply voltage that is connected to a first core in the multi-core microcontroller; and
  a low dropout (LDO) linear power supply regulator comprising:
    an LDO linear power supply for generating an LDO power supply voltage in response to a first enable signal, where the LDO power supply voltage is connected as a supply voltage to a standby core in the multi-core microcontroller;
    a load switch connecting the first power supply voltage as the supply voltage to the standby core in response to a second enable signal; and
    a digital control interface which generates the first and second enable signals so that, during an active mode, the first enable signal disables the LDO linear power supply regulator and the second enable signal closes the load switch to connect the first power supply voltage as the supply voltage to the standby core, and so that, during a standby mode, the first enable signal enables the LDO linear power supply regulator and the second enable signal opens the load switch to disconnect the first power supply voltage from the supply voltage to the standby core, where the load switch comprises an NMOS switch and PMOS switch connected in parallel between the first power supply voltage and the LDO power supply voltage and controlled by the second enable signal.

10. The multi-core microcontroller processing system of claim 9, where the first power supply comprises a switched mode power supply comprising a pulse width modulator (PWM) controller and a buck converter.

11. The multi-core microcontroller processing system of claim 9, where the LDO linear power supply comprises an ultra-low quiescent current LDO voltage power supply comprising an error amplifier that drives an internal PMOS pass FET.

12. The multi-core microcontroller processing system of claim 9, where the LDO linear power supply, load switch, and digital control interface are formed in a single integrated circuit LDO linear power supply regulator.

13. The multi-core microcontroller processing system of claim 9, where the LDO linear power supply regulator comprises a first voltage monitor circuit that is connected to detect that the first power supply voltage meets or exceeds a minimum voltage threshold before notifying the digital control interface that the second enable signal can be generated to the load switch for connecting the first power supply voltage as the supply voltage to the standby core.

14. The multi-core microcontroller processing system of claim 9, where the LDO linear power supply regulator comprises a second voltage monitor circuit that is connected to detect that the first power supply voltage is at or below a maximum voltage threshold before notifying the digital control interface that the first enable signal can be generated to enable the LDO linear power supply.

15. An apparatus comprising:
  a switched mode power supply comprising a switching regulator configured to convert an input voltage of a power supply circuit to a power supply voltage which is connected to the first core in the multi-core microcontroller; and
  a low dropout (LDO) linear voltage regulator which is connected between the switched mode power supply and the standby core in the multi-core microcontroller comprising:
    an error amplifier and internal pass FET configured to convert the input voltage of the power supply circuit to a standby low-power core supply voltage for the standby core when the power supply circuit is in a standby operational mode, and to be disabled when the power supply circuit is in an active operational mode; and
    an internal load switch which connects the power supply voltage to a standby supply voltage node of the standby core during active operational mode and which disconnects the power supply voltage from the standby supply voltage node of the standby core during standby operational mode so that standby low-power core supply voltage is maintained within approximately 20 mV-30 mV with respect to the power supply voltage upon transitioning from the standby operational mode to the active operational mode, where the LDO linear voltage regulator comprises a digital control which generates first and second enable signals so that, during active operational mode, the first enable signal disables the LDO linear voltage regulator and the second enable signal closes the internal load switch to connect the power supply voltage as the supply voltage to the standby core, and so that, during a standby mode, the first enable signal enables the LDO linear voltage regulator and the second enable signal opens the internal load switch to disconnect the power supply voltage from the standby core, and the internal load switch comprises an NMOS switch and PMOS switch connected in parallel between the power supply voltage and the standby supply voltage node of the standby core and controlled by the second enable signal.

16. The apparatus of claim 15, where the LDO linear voltage regulator comprises a single integrated circuit LDO linear power supply regulator.

* * * * *